(12) United States Patent
Agarwal et al.

(10) Patent No.: US 11,383,928 B2
(45) Date of Patent: Jul. 12, 2022

(54) SYSTEMS AND METHODS FOR OPTIMIZING SCHEDULING OF NON-PREEMPTIVE TASKS IN MULTI-ROBOTIC ENVIRONMENT

(71) Applicant: Tata Consultancy Services Limited, Mumbai (IN)

(72) Inventors: Marichi Agarwal, Kolkata (IN); Chayan Sarkar, Kolkata (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 277 days.

(21) Appl. No.: 16/792,945

(22) Filed: Feb. 18, 2020

(65) Prior Publication Data

US 2020/0262650 A1    Aug. 20, 2020

(30) Foreign Application Priority Data

Feb. 19, 2019 (IN) .............. 201921006550

(51) Int. Cl.
| | |
|---|---|
| *G06F 7/00* | (2006.01) |
| *B65G 1/137* | (2006.01) |
| *G06Q 10/06* | (2012.01) |
| *G06Q 10/08* | (2012.01) |

(52) U.S. Cl.
CPC ..... *B65G 1/1373* (2013.01); *G06Q 10/06316* (2013.01); *G06Q 10/087* (2013.01)

(58) Field of Classification Search
CPC .......... B65G 1/1373; G06Q 10/06316; G06Q 10/087; G06Q 10/00
USPC .......................................... 700/213–214, 228
See application file for complete search history.

(56) References Cited

U.S. PATENT DOCUMENTS

| | | | |
|---|---|---|---|
| 10,514,949 B1* | 12/2019 | Korda ................... | G06F 9/4831 |
| 2011/0015787 A1* | 1/2011 | Tsusaka ............... | G05B 19/423 |
| | | | 901/4 |
| 2017/0131727 A1 | 5/2017 | Kurdi et al. | |
| 2017/0293844 A1 | 10/2017 | Gombolay et al. | |

(Continued)

OTHER PUBLICATIONS

Khamis, A. et al. (May 2015). "Multi-robot Task Allocation: A Review of the State-of-the-Art," located at https://link.springer.com/chapter/10.1007/978-3-319-18299-5_2. (23 pages).

(Continued)

*Primary Examiner* — Yolanda R Cumbess
(74) *Attorney, Agent, or Firm* — Finnegan, Henderson, Farabow, Garrett & Dunner LLP (57) ABSTRACT

The systems and methods provide for optimizing the scheduling of non-preemptive tasks in the multi-robot environment. The embodiment provides for scheduling, by implementing an Online Minimum Performance Loss Scheduling (OMPLS) technique, initially, tasks with a higher performance loss value and then secondly, tasks that can be scheduled within their deadline and having a low performance loss value amongst the merged tasks; and finally minimizing, a performance loss value of a remaining subset of tasks that cannot be scheduled within a pre-defined deadline. Moreover, the embodiments herein further provides executing the priority update on each of the remaining subset of tasks for optimizing the scheduling of the non-pre-emptive tasks.

20 Claims, 6 Drawing Sheets

(56) References Cited

U.S. PATENT DOCUMENTS

2019/0039237 A1* 2/2019 Nakashima ............ B25J 9/1669
2020/0254615 A1* 8/2020 Bryner ..................... B25J 9/102

OTHER PUBLICATIONS

Huang, L. et al. (Jul. 2018). "Multiple-solution Optimization Strategy for Multi-robot Task Allocation," *IEEE Transactions on Systems, Man, and Cybernetics: Systems*, pp. 1-12.
Alshawi, M.A. et al. (Nov. 2017). "Minimal Time Dynamic Task Allocation for a Swarm of Robots," *International Journal of Mechanical Engineering and Robotics Research*, vol. 6, No. 6; pp. 481-487.

* cited by examiner

SYSTEMS AND METHODS FOR OPTIMIZING SCHEDULING OF NON-PREEMPTIVE TASKS IN MULTI-ROBOTIC ENVIRONMENT

PRIORITY CLAIM

This U.S. patent application claims priority under 35 U.S.C. § 119 to: India Application No. 201921006550, filed on Feb. 19, 2019. The entire contents of the aforementioned application are incorporated herein by reference.

TECHNICAL FIELD

This disclosure relates generally to robotics process automation, and more particularly to optimizing scheduling of non-preemptive tasks in a multi-robot environment.

BACKGROUND

Multi-robot systems and related technologies are being used widely in digital and automation era in a variety of applications and industries. For example, for a warehouse procurement system, the multi-robot systems are deployed to automate the process of storing and retrieving a wide variety of objects in and out of a warehouse. An efficient warehouse management ensures fluent delivery of the ordered goods to the respective customers and impacts modern day businesses significantly. Distributors and e-retailers generally provide an estimated-time-of-arrival (ETA) for any goods delivery and pledge for fast and time bounded delivery as a value-added service.

Movement of goods or objects in and out of the warehouse poses a major challenge in terms of scheduling of tasks (relating to the movement to goods). Copious amount of demands flowing into the warehouse procurement system in real-time necessitates a demand for an optimum scheduling. With a rapid development of e-commerce and modern logistics, warehousing systems have a tremendous scale of inventory and a wide range of high demand vis-a-vis short-picking time, thereby demanding deployment of robotic systems.

Task allocation in multi-robot systems is thus gaining a significant importance due to application in industrial and other technological domains. The process of assigning individual robots to sub-tasks of a given system-level task is called task allocation, and comprises a key functionality required of any multi-robot system. The purpose of task allocation is to assign robots task(s) in a way that will enhance the performance of the multi-robot system, which comprises reducing overall execution time. Generally, task allocation is an essential requirement for multi-robot systems functioning in unknown dynamic environments. It allows robots to change their behavior in response to environmental changes or actions of other robots in order to improve overall system performance.

The inventors here have recognized several technical problems with such conventional systems, as explained below. Task allocation in the multi-robot systems thus poses a complex challenge, especially in such robotics environments, wherein robots are equipped with different capabilities that are required to perform various tasks with different requirements and constraints in an optimal way. Because the problem of task allocation is a dynamic decision problem that varies in time with phenomena including environmental changes, the problem must be solved iteratively a specified time interval. Thus, the problem of task allocation becomes more complex to tackle. The requirements of a particular technological domain under consideration further affect the features and complexity of multi-robot task allocation problems.

SUMMARY

Embodiments of the present disclosure present technological improvements as solutions to one or more of the above-mentioned technical problems recognized by the inventors in conventional systems. For example, in one embodiment, a method for optimizing scheduling of non-preemptive tasks in a multi-robot environment, the method comprising: defining, via a set of robots, a plurality of tasks, wherein each of the plurality of task is a non-preemptive schedulable task characterized by an arrival time, an execution time, a deadline and a performance loss function per time unit, and wherein each of the plurality of task is executed in the multi-robotic environment; merging, by one or more hardware processors, one or more previously assigned tasks and one or more newly arriving tasks from the defined plurality of tasks, wherein the one or more previously assigned tasks are non-executed tasks already assigned to one or more robots amongst the set of robots, and wherein the one or more newly arriving tasks comprise a non-executed task to be assigned amongst the set of robots; optimizing scheduling of the merged in the multi-robot environment, wherein the optimizing comprises scheduling, by implementing an Online Minimum Performance Loss Scheduling (OMPLS) technique, a first set of tasks amongst the set of robots, wherein the first set of tasks comprise tasks with a higher performance loss value amongst the merged tasks, and wherein the first set of tasks further comprise at least one task exceeding a threshold of waiting time and having a less priority over the tasks with the higher performance loss value scheduling, via the OMPLS technique, a second set of tasks amongst the set of robots, wherein the second set of tasks comprise tasks that can be scheduled within their deadline and having a low performance loss value amongst the merged tasks; minimizing, by a list-scheduling technique, a performance loss value of a remaining subset of tasks, wherein the remaining subset of tasks comprise tasks that cannot be scheduled within a pre-defined deadline; eliminating, via the list-scheduling technique, one or more high priority tasks from the newly arriving tasks for optimizing scheduling of the non-preemptive tasks; eliminating the one or more high priority tasks is iteratively until each task amongst the plurality of tasks is assigned to at least one robot; executing a priority update on each of the remaining subset of tasks for optimizing scheduling of the non-preemptive tasks, wherein the priority update is executed by incrementing a priority function of each of the remaining subset of tasks upon determining that the execution time of each of the remaining subset of tasks is greater than an initial pre-defined threshold, and wherein the initial pre-defined threshold is identified using a pre-defined deadline.

In another aspect, there is provided a system for optimizing scheduling of non-preemptive tasks in a multi-robot environment, the system comprising a memory storing instructions; one or more communication interfaces; and one or more hardware processors coupled to the memory via the one or more communication interfaces, wherein the one or more hardware processors are configured by the instructions to: define, via a set of robots, a plurality of tasks, wherein each of the plurality of task is a non-preemptive schedulable task characterized by an arrival time, an execution time and a performance loss function per time unit, wherein each of the plurality of task is executed in the multi-robotic environment; merge one or more previously assigned tasks and one or more newly arriving tasks from the defined plurality of tasks, wherein the one or more previously assigned tasks are non-executed tasks already assigned to one or more robots amongst the set of robots, and wherein the one or more newly arriving tasks comprise a non-executed task to be assigned amongst the set of robots; optimize scheduling of the merged tasks in the multi-robot environment, wherein the optimizing comprises: schedule, by implementing an Online Minimum Performance Loss Scheduling (OMPLS) technique, a first set of tasks amongst the set of robots, wherein the first set of tasks comprise tasks with a higher performance loss value amongst the merged tasks, and wherein the first set of tasks further comprise at least one task exceeding a threshold of waiting time and having a less priority over the tasks with the higher performance loss value; schedule, via the OMPLS technique, a second set of tasks amongst the set of robots, wherein the second set of tasks comprise tasks that can be scheduled within their deadline and having a low performance loss value amongst the merged tasks; minimize, by a list-scheduling technique, a performance loss value of a remaining subset of tasks, wherein the remaining subset of tasks comprise tasks that cannot be scheduled within a pre-defined deadline; eliminate, via the list-scheduling technique, one or more high priority tasks from the newly arriving tasks for optimizing scheduling of the non-preemptive tasks; assign the eliminated one or more high priority tasks to an idle robot amongst the set of robots, and wherein the idle robot is a robot not executing any of the plurality of tasks; iteratively perform the step of eliminating the one or more high priority tasks until each task amongst the plurality of tasks is assigned to at least one robot; implement the OMPLS technique by executing a priority update on each of the remaining subset of tasks for optimizing scheduling of the non-preemptive tasks; and execute the priority update by incrementing a priority function of each of the remaining subset of tasks upon determining that the execution time of each of the remaining subset of tasks is greater than an initial pre-defined threshold, and wherein the initial pre-defined threshold is identified using a pre-defined deadline.

In yet another aspect, there is provided one or more non-transitory machine readable information storage mediums comprising one or more instructions which when executed by one or more hardware processors causes the one or more hardware processors to perform a method for optimizing scheduling of non-preemptive tasks in a multi-robot environment, the method comprising: defining, via a set of robots, a plurality of tasks, wherein each of the plurality of task is a non-preemptive schedulable task characterized by an arrival time, an execution time, a deadline and a performance loss function per time unit, and wherein each of the plurality of task is executed in the multi-robotic environment; merging one or more previously assigned tasks and one or more newly arriving tasks from the defined plurality of tasks, wherein the one or more previously assigned tasks are non-executed tasks already assigned to one or more robots amongst the set of robots, and wherein the one or more newly arriving tasks comprise a non-executed task to be assigned amongst the set of robots; optimizing scheduling of the merged in the multi-robot environment, wherein the optimizing comprises scheduling, by implementing an Online Minimum Performance Loss Scheduling (OMPLS) technique, a first set of tasks amongst the set of robots, wherein the first set of tasks comprise tasks with a higher performance loss value amongst the merged tasks, and wherein the first set of tasks further comprise at least one task exceeding a threshold of waiting time and having a less priority over the tasks with the higher performance loss value scheduling, via the OMPLS technique, a second set of tasks amongst the set of robots, wherein the second set of tasks comprise tasks that can be scheduled within their deadline and having a low performance loss value amongst the merged tasks; minimizing, by a list-scheduling technique, a performance loss value of a remaining subset of tasks, wherein the remaining subset of tasks comprise tasks that cannot be scheduled within a pre-defined deadline; eliminating, via the list-scheduling technique, one or more high priority tasks from the newly arriving tasks for optimizing scheduling of the non-preemptive tasks; eliminating the one or more high priority tasks is iteratively until each task amongst the plurality of tasks is assigned to at least one robot; executing a priority update on each of the remaining subset of tasks for optimizing scheduling of the non-preemptive tasks, wherein the priority update is executed by incrementing a priority function of each of the remaining subset of tasks upon determining that the execution time of each of the remaining subset of tasks is greater than an initial pre-defined threshold, and wherein the initial pre-defined threshold is identified using a pre-defined deadline.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments of the present disclosure provide for systems and methods for optimizing scheduling of non-preemptive tasks in a multi-robot environment. In general, multi-robot task allocation comprises assigning tasks efficiently amongst robots to optimize task scheduling or task allocation. For example, task allocation in a warehouse, wherein objects are scheduled to be dispatched when a customer places an order for it, comprises fetching objects from storage racks to the packaging dock.

The problem of scheduling non-preemptive or atomic tasks to homogeneous and autonomous robots in a smart environment, especially a smart warehouse environment, is closely similar to a non-preemptive scheduling or a sporadic process scheduling on a homogeneous multi-processors system. The goal is to schedule optimally a maximum number of the non-preemptive tasks within a deadline corresponding to each of such tasks. Further, since each of the non-preemptive tasks has a deadline and a performance loss attributed to it that may be incurred on a multi-robot system and if any of the set of non-preemptive tasks is not completed within its corresponding deadline, then the goal of a task scheduling system is to reduce the number of deadline misses and minimize the performance loss.

Traditional systems and methods, especially in warehouses implementing robots or related technologies, do not consider the deadline and the performance loss associated with each of the non-preemptive task, and thus discard many tasks amongst the non-preemptive, if such non-preemptive tasks are bound to miss their deadlines. However, in general, each task in the smart warehouse environment has to be completed even if the corresponding deadline is surpassed. Merging the non-preemptive tasks and scheduling them on the multi-processors system (or a multi-core system) comprises s major task scheduling problem.

The method disclosed attempts to overcome the challenges faced by the traditional systems and methods. For example, the method disclosed cites a scheduling technique, wherein the scheduling technique schedules each of the non-preemptive task, thereby providing for scheduling of even low-priority task(s) having a low performance loss value. Further, the method disclosed considers the deadline and the performance loss associated with each of the non-preemptive while allocating task(s) in the multi-robotic environment, and thereby provides for an optimum scheduling and minimization of overall performance loss value in the multi-robotic environment.

Figure 1:
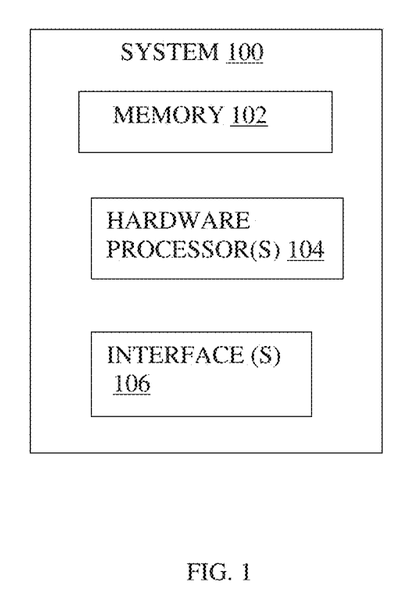
FIG. 1 a block diagram of a system for optimizing scheduling of non-preemptive tasks in a multi-robot environment, in accordance with some embodiments of the present disclosure.

FIG. 1 illustrates an exemplary block diagram of a system 100 for optimizing scheduling of non-preemptive tasks in a multi-robot environment, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 can be configured to store any data that is associated with optimizing the scheduling of non-preemptive tasks in the multi-robot environment. In an embodiment, the information pertaining to robots, merged tasks, optimization of scheduling, an Online Minimum Performance Loss Scheduling (OMPLS) technique, performance loss minimization etc. is stored in the memory 102. Further, all information (inputs, outputs and so on) pertaining to the generating of response to interactive user queries based upon optimizing the scheduling of non-preemptive tasks in the multi-robot environment, as history data, for reference purpose.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

Referring now to the drawings, and more particularly to FIG. 1 through 6, where similar reference characters denote corresponding features consistently throughout the figures, there are shown preferred embodiments and these embodiments are described in the context of the following exemplary system and/or method.

Figure 2:
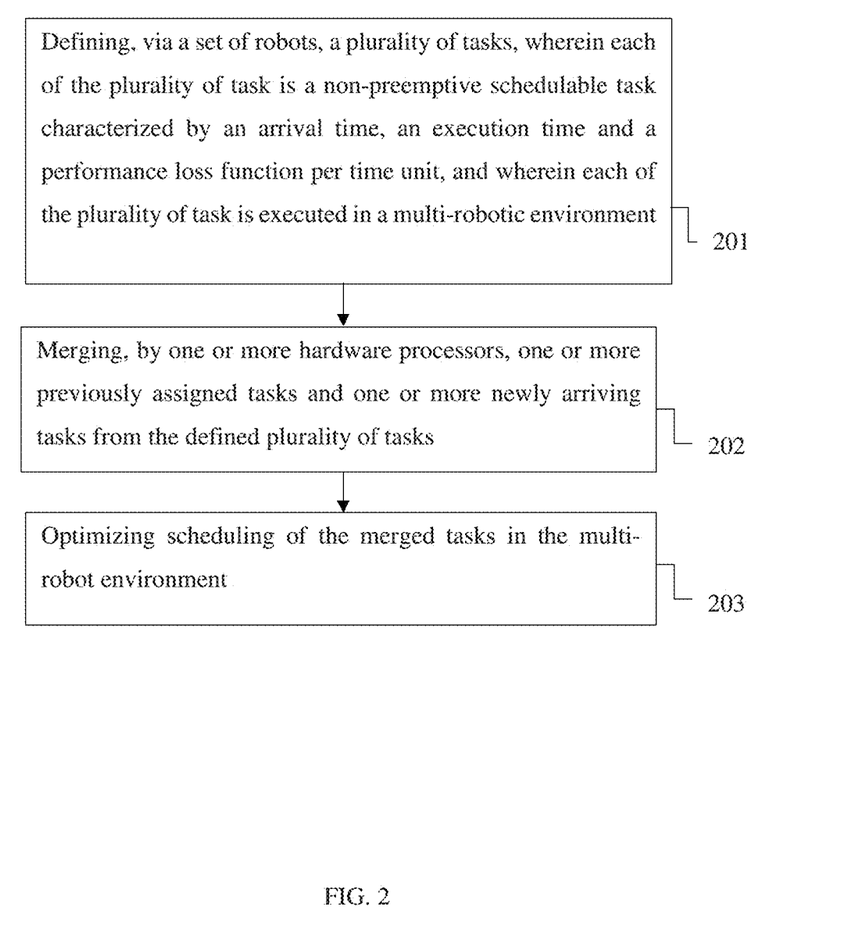
FIG. 2 is a flow diagram illustrating the steps involved in the process of optimizing the scheduling of non-preemptive tasks in the multi-robot environment, in accordance with some embodiments of the present disclosure.

FIG. 2, with reference to FIG. 1, illustrates an exemplary flow diagram of a method for optimizing the scheduling of non-preemptive tasks in the multi-robot environment, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 201, the one or more hardware processors 104 are configured to define, via a set of robots, a plurality of tasks, wherein each of the plurality of task is a non-preemptive schedulable task characterized by an arrival time, an execution time (or a task execution time), a deadline, a specified time interval for completing the non-preemptive task, and a performance loss function per time unit. The term 'performance loss' as used herein may be understood to be similar to the term 'penalty' which is a commonly used term in a warehouse task scheduling, wherein task scheduling generally comprises corresponding 'deadlines' and 'penalties'.

Further, although the proposed methodology has been explain with reference to a warehouse system, it may not be understood to be limited to warehouse system(s) only. The proposed methodology may be implemented or extended to all such environments/applications/technologies or related scenarios, wherein scheduling or task scheduling is performed using robots or related technologies. The step of defining the plurality of tasks may be discussed in the light of a set of below assumptions:

Set of Assumptions—

(i) It is assumed that when a task arrives, the warehouse management system computes an execution time of the task based upon the storage location of the respective goods, assigns a deadline based on the overall expected-time-of-arrival pledged to the customer, and assigns a performance loss value based on customer profile and type of object (ii) At any time instant, there are n tasks available in a multi-robotic environment that need to be completed by m homogeneous robots. Each robot has sufficient available energy to complete a task;

(iii) If a customer places an order for multiple goods, each good pick up is treated as a separate task. In this case, each task may have different execution time, deadline, and performance loss value;

(iv) For simplicity, it may be assumed that actuation time is the same for all tasks, and is not included in the task execution time. Thus, task execution time only constitutes the to-and-fro travel time of the robot;

(v) If a customer places an order for multiple goods, each good picked up is treated as a separate task. In this scenario, each of the plurality of tasks may have a different execution time. But, they are associated with an identical deadline and an identical performance loss value; and (vi) Every task is atomic and non-preemptive. The robot must execute the task till completion once it is started. Jobs cannot be executed concurrently by more than one robot. It may be assumed that the tasks are independent, that is, the execution of one task is not contingent on the execution of any other task.

As discussed above, the technical problem of allocating tasks to the plurality of robots may be mapped to a task scheduling on a multi-processor system (not shown in the figure). The method disclosed facilitates assigning atomic tasks to a team of homogeneous robots on-the-fly such that the minimum penalty is incurred on the system by the tasks failing to meet their deadline. The tasks are non-clairvoyant and each task ($T_i$) is characterized by an arrival time ($a_i$), an execution time ($e_i$), a deadline ($d_i$) and a performance loss value ($p_i$). If a task misses its deadline and completes execution at time ($c_i$), it incurs a performance loss of ($c_1-d_i$)×$p_i$ units.

According to an embodiment of the present disclosure, at step 202, the one or more hardware processors 104 are configured to merge one or more previously assigned tasks and one or more newly arriving tasks from the defined plurality of tasks, wherein the one or more previously assigned tasks are non-executed tasks already assigned to one or more robots amongst the set of robots, and wherein the one or more newly arriving tasks comprise a non-executed task to be assigned amongst the set of robots.

In an embodiment, the one or more hardware processors 104 are configured to perform the merging by sorting the one or more previously assigned tasks and the one or more newly arriving tasks in a queue based upon an non-increasing order of a performance loss value corresponding to the one or more previously assigned tasks and the one or more newly arriving tasks. Considering an example scenario, when the tasks are sorted based upon the performance loss values, the list may be generated as (3, 2, 4, 5, 1), wherein initially schedule task id 3 may be scheduled, then id 2, then 4, and the like.

According to an embodiment of the present disclosure, at step 203, the one or more hardware processors 104 are configured to optimize the scheduling of the merged tasks in the multi-robot environment. At step 203, the one or more hardware processors 104 may initially be configured to schedule, by implementing an Online Minimum Performance Loss Scheduling (OMPLS) technique, a first set of tasks amongst the set of robots, wherein the first set of tasks comprise tasks with a higher performance loss value amongst the merged tasks, and wherein the first set of tasks further comprise at least one task exceeding a threshold of waiting time and having a less priority over the tasks with the higher performance loss value.

Further, the one or more hardware processors 104 are configured to schedule via the OMPLS technique, a second set of tasks amongst the set of robots, wherein the second set of tasks comprise tasks that can be scheduled within their deadline and having a low performance loss value amongst the merged tasks. The process of optimizing the scheduling via the proposed OMPLS technique may now discussed in detail in the light of the technical challenges faced by the traditional systems and methods while scheduling/allocating jobs in multi-robotic/multi-process environment(s).

Generally, as the number of robots deployed in a warehouse is limited and at some point in time, the number of tasks may be much larger than the capabilities of the team of robots, which may lead to a scenario wherein some tasks missing out on being served within their deadline. Since the warehouse promises to complete all the tasks, it incurs a performance loss (or a penalty) on a system (implementing robotic process for completing the tasks) proportional to the delay.

A task $t_i$ is characterized by a four-tuple ($a_i$ $e_i$ $d_i$ $p_i$): an arrival time $a_i$, an execution time $e_i$, a relative deadline $d_i$, and a penalty $p_i$. Assuming the system (via which the multi-robotic environment is implemented and executed) (re)starts at time zero, wherein $a_i$ is the time unit after which task $t_i$ arrives in the multi-robotic environment and must occupy $e_i$ units of time on a robot. If the system starts at time $s_i(>a_i)$, the system finishes its execution at $s_i+e_i$ time unit. Now the task imposes a penalty of $p_i$ per unit time delay in completion beyond the deadline given by ($a_i+d_i$).

In an embodiment, the performance loss function may be defined as:

$$P(t_i)=\max(0,(c_i-d_i)\times p_i) \qquad \text{equation (1)}$$

wherein $c_i$ represents a completion time for a task $t_i$, wherein $t_i$ corresponds to the plurality of tasks. Referring to equation (1), it may be noted that if a task is executed within a deadline, there is no performance loss but once the task fails to execute within the deadline (or misses the deadline), the performance loss increases proportional to time. Thus the plurality of tasks may be partitioned, that is, n tasks amongst m robots and an order of executing a subset of tasks assigned to a robot, wherein $T(r_j)$ denotes the subset of tasks assigned to robot $r_j$, and wherein the subset of tasks correspond to the plurality of tasks.

According to an embodiment of the present disclosure, suppose there are m identical robots, that is, R={$r_1$, $r_2$, . . . , $r_m$} working in parallel to complete the plurality of tasks represented as T={$t_1$, $t_2$, . . . , $t_n$}, wherein a task $t_i$ (amongst the plurality of tasks) arrived at a scheduler (implemented to schedule a task via the one or more hardware processors 104) at its release time $a_i$. The scheduler merges the tasks (as discussed above) amongst the m robots and an order of execution the subset of tasks assigned to a robot, wherein $T(r_j)$ denote a subset of tasks assigned to robot $r_j$. Thus, an objective function of the task scheduler may be denoted by equation (2) below:

$$\min \Sigma_{i=1}^{n} P(t_i) \qquad \text{equation (2)}$$

Also, by the time these tasks are completed a new set of tasks may arrive. Further, the fleet of robots may also change as some of them may deplete their energy or some new robot may join with enhanced energy. Thus, an optimized scheduling technique is required in such an environment to optimize the scheduling amongst the robots.

Online Minimum Performance Loss Scheduling (OMPLS) technique—The proposed OMPLS technique facilitates optimizing the scheduling of the set of non-preemptive tasks (or sporadic tasks) on the multi-processor system and in the multi-robot environment, wherein each of the set of non-preemptive tasks has a deadline and a performance loss value. The proposed technique facilitates assigning atomic tasks to a team of homogenous robots on-the-fly such that the minimum penalty is incurred on the system by the tasks failing to meet their deadline.

The OMPLS technique thus schedules non-clairvoyant, non-preemptive tasks having a performance loss value on a multi-robot system by maintaining a universal queue, wherein all the newly arriving tasks are stored. The OMPLS technique further maximizes task scheduling within the deadline and achieves a competitive ratio of up to 1 as compared to the traditional systems and methods. Finally, the OMPLS technique facilitates a bounded lateness in task execution when tasks cannot be scheduled within their deadline. Thus, the proposed technique eliminates starvation of a task.

According to an embodiment of the present disclosure, the OMPLS technique initially considers the merged tasks from step 202 above. As discussed above in step 202 above, the one or more previously assigned tasks are non-executed tasks already assigned to one or more robots amongst the set of robots, and wherein the one or more newly arriving tasks comprise a non-executed task to be assigned amongst the set of robots. The set of pre-assigned tasks may thus be defined as those schedulable tasks that not guarantee that they will be executed before their deadline, as they may be replaced by a higher priority task arriving later in time. The priority of a task is judged by the performance loss value it would incur on the system per unit time delay. The tasks are classified based on the priority. Tasks with highest penalty value (performance loss=10) is treated as the top priority task (priority=1).

The OMPLS technique thus considers the merged tasks in the queue and seeks to schedule with paramount importance, the ones that would incur a higher penalty if delayed beyond its deadline. The delayed tasks are re-evaluated and scheduled in order to minimize the overall system performance loss. The OMPLS technique provides for delaying tasks with lower performance loss value for some time to schedule the ones with a higher penalty value, early. However, a continuous delaying of a task with low penalty value may lead to its starvation, hence an optimized scheduling may be required.

In an embodiment, at any instant time $\tau$, a multi-robotic system may be in one of the following states:

All the robots are engaged in executing their respective tasks keep executing; and Some robots on completing their current task are ready to pick a new one, wherein:
- if no new task has arrived in the system—pick a task from the task queue of the respective robot;
- if a new task is introduced in the system—follow sub-routine TaskScheduling; and
- if there is no new task arrival and also there is no task available in the task queue of a robot—stay idle.

In an embodiment, the one or more hardware processors 104 implements the sub-routine TaskScheduling whenever a robot finishes a task and at least one new task is introduced in the multi-robotic system or a new robot joins the fleet of robots. Intuitively, merging the set of pre-assigned tasks (already assigned to the robots) with the set of newly arriving tasks, and then determining the schedule results in a minimum performance loss value and thus, optimizes the scheduling. The tasks are allocated to the robots following sub-routine TaskScheduling.

---

Algorithm: Online Minimum Performance Loss Scheduling (OMPLS) technique. A heuristic for scheduling non-preemptive task t minimize overall penalty at time $\tau$.

---

Input: Tasks in waiting queue ($\omega$) awaiting allocation. Active robots
    R in the warehouse.
    Output: Schedule of tasks on each robot ($R_{schedule}$).
    1.    Routine TaskScheduling (T, R)
    2.    //Schedule High – priority Tasks
$\overline{\omega} \leftarrow \omega \; \forall T_i \in \omega, \, T_i.\text{priority} = 0;$
    3.    R $\leftarrow$ compaction($\overline{\omega}$) ;
    4.    R $\leftarrow$ listScheduling ($\overline{\omega}$) ;
    5.    //Schedule Remaining Tasks
        R $\leftarrow$ compaction($\overline{\omega}$) ;
    6.    R $\leftarrow$ listScheduling ($\omega$)
    7.    updatePriority ( );

---

In an embodiment, initially, each of the merged plurality of tasks may be considered for scheduling amongst available robots (that is, robot(s) not executing any task) from the set of robots. The one or more hardware processors 104 may then perform a compaction check to schedule a task $t_i$ within its deadline, wherein the compaction check may be performed across each robot for time interval $[a_i, a_i+d_i]$. In other words, the OMPLS technique performs a check whether $e_i$ continuous time units may be located on a robot in this duration, without forcing any other tasks amongst the set of pre-assigned tasks to miss their deadline.

In an embodiment, to further ensure that scheduling a task $t_i$ on a robot $r_k$ does not results in a schedulable task to miss its deadline, both equations (3) and (4) mentioned infra must be satisfied:

$$d_i - \left( \sum_{\substack{t_j \in T(r_k) \\ d_j \le d_i}} e_j + e_i \right) \ge 0; \text{ and} \qquad \text{equation (3)}$$

$$\forall \, t_j \in T(r_k): \, d_j > d_i: \, d_j - \left( \sum_{\substack{t_j \in T(r_k) \\ d_j \le d_i}} e_i + e_j \right) \ge 0 \qquad \text{equation (4)}$$

wherein equation (3) facilitates enough space to execute the task $t_i$ after executing all the tasks scheduled on the robot $r_k$ and has a deadline smaller than $t_i$, and wherein equation (4) ensures that the tasks that are already scheduled on rk and has a deadline greater than ti are still schedulable if we schedule $t_i$ as well.

In an embodiment, at step 203, the one or more hardware processors 104 are finally configured to minimize, by a list-scheduling technique, a performance loss value of a remaining subset of tasks, wherein the remaining subset of tasks comprise tasks that cannot be scheduled within a pre-defined deadline. Any task $t_i$ that may be scheduled to begin after $[a_i, a_i-d_i]$ is a task that completes its execution within a pre-defined deadline. A task beginning to execute after $(d_i-e_i)$ shall complete execution after $d_i$ imposes a performance loss on the multi-robotic system. The task beginning to execute after $(d_i-e_i)$ may be allocated amongst robot(s) by implementing the list scheduling technique.

In an embodiment, the step of minimizing the performance loss value of the remaining subset of tasks comprises eliminating, via the list-scheduling technique, one or more high priority tasks from the newly arriving tasks for optimizing scheduling of the non-preemptive tasks, wherein the eliminated one or more high priority tasks are assigned to an idle robot amongst the set of robots, and wherein the idle robot is a robot not executing any of the plurality of tasks. Thus, a task with a highest priority may be removed from the waiting queue and assigned to a first robot, for example, $r_k$, $1 \leq k \leq m$, wherein the robot $r_k$ is a robot that is idle, or finishes its task earliest amongst the set of robots. The one or more hardware processors 104 perform the step of eliminating the one or more high priority tasks iteratively until each task amongst the plurality of tasks is assigned to at least one robot.

As mentioned supra, the traditional systems and methods implementing robotic processes fail to work when there is a continuous delaying of a task with low penalty value may lead to its starvation. To overcome this limitation faced by the traditional systems and methods, the method disclosed, that is, the OMPLS technique, provides for executing a priority update on each of the remaining subset of tasks for optimizing scheduling of the non-preemptive tasks. In an embodiment, after each task is assigned to a robot (or allocated to waiting queue of the robot), the one or more hardware processors 104 execute (or run) a priority value on robot(s) that may violate their deadline.

Hence, to optimize the scheduling of the non-preemptive tasks in the multi-robot environment, the one or more hardware processors 104 execute the priority update by incrementing a priority function of each of the remaining subset of task, upon determining that the execution time of each of the remaining subset of tasks is greater than an initial pre-defined threshold, and wherein the initial pre-defined threshold is identified using a pre-defined deadline. Thus, the priority of each of the subset of tasks is incremented by a unit if a current time $\tau$ exceeds its initial pre-defined threshold.

In an embodiment, the initial pre-defined threshold for a task may be set identical to its absolute deadline. Threshold ($th_i$) may thus be defined as in equation (5) below:

$$th = \begin{cases} th + (d_i - a_i), & \text{if } r \geq th_i \\ th, & \text{otherwise} \end{cases} \quad \text{equation (5)}$$

By referring to equation (5) above, it may be noted that if a task $T_i$ fails to execute within its pre-defined initial threshold, the one or more hardware processors 104 increment the threshold by its initial value equal to its relative deadline, and a task priority may be incremented by a unit step, wherein incrementing the threshold ensures that after $priority_i$ iterations, the task $T_i$ may be identified as a critical task (priority=0), thereby attaining the highest priority. The one or more hardware processors 104 assign such critical task(s) to a robot, wherein the critical task(s) so identified and assigned cannot be replaced by any other task(s).

According to an embodiment of the present disclosure, the performance evaluation of the OMPLS technique may discussed via simulation results. The method disclosed implements a Capacity-Constraint Vehicle Routing problem (CVRP) datasets (vrp) for evaluating the performance of the OMPLS technique, wherein a depot location may be used a packaging dock locations, and site locations may be used as storage locations of objects(s) to be picked up by robots. The simulation results have been discussed for only 1000 tasks (that is, the site locations) from this set.

As mentioned supra, each task may be represented as a tuple, that is, $t_i = \langle a_i, e_i, d_i, p_i \rangle$, wherein the execution time ($e_i$) may be set as the to-and-fro travel time of a robot from the packaging dock to the storage location of the object. For execution time, the following strategies may be considered:

$d_i = 2e_i$, wherein the deadline $d_i$ of task is set to twice the corresponding execution time $e_i$. Although a number of tasks may missing deadline due to large number of tasks as compared to number of robots, such a rare scenario is effectively handled by implementing the method disclosed;

$d_i \in [2e_i, 10e_i]$, wherein the deadline $d_i$ is set to a random value in the range of $2e_1, 10e_1$, wherein $2e_i, 10e_i$ are randomly distributed;

$d_i \in [5e_i, 10e_i]$, wherein the deadline $d_i$ is set using a uniform distribution in the range of $5e_i, 10e_i$. This represents a scenario wherein a large number of tasks are schedulable within corresponding deadline each of the large number of tasks (if not all); and d←mix, comprising a mix of previous three datasets with an equal probability to ensure that the scheduler is not favoring a particular distribution of deadline.

Further, for each combination of execution time and deadline mentioned supra, the one or more hardware processors 104 assign a penalty to each task using below three strategies:

p←[1,10], wherein a performance loss is set to one or more random values generated using a uniform distribution in the range of 1 and 10;

p←same, wherein the performance loss is set to one identical value, for example 1, for each of the plurality of tasks; and p←extreme[1 or 10], wherein the performance loss is set to either of two extreme values, that is 1 or 10, with an equal probability.

In an embodiment, the OMPLS technique may be evaluated based upon two metrics, that is, overall performance loss incurred while completing all the tasks, and the number of deadline miss between time $\tau_0$ and $\tau'$, wherein $\tau' > \tau_0$. To validate the performance of the scheduler, a stable multi-robotic system may be represented and until a time $\tau_0$. After time $\tau_0$, a burst of task arrives in the multi-robotic system until time $\tau'$, and the task inflow reduces after $\tau'$. By referring to FIG. 3 and FIG. 4, task arrival patterns during a burst may be referred, wherein FIG. 3 depicts a continuous high inflow rate for a specific time span—steady high traffic, and wherein FIG. 4 depicts multiple tasks appear in a tiny time-scale and the pattern continues for some time—spiking traffic.

In an embodiment, the number of tasks missing deadline, and the corresponding performance loss values incurred depends on the rate at which the tasks appear in the multi-robotic system, and the number of robots available to execute the tasks. The number of active robots (amongst a total number of robots) may be fixed to 50 to perceive robustness of the multi-robotic system prior to and post the task burst, wherein approximately 1000 were added during such high traffic time. The method disclosed was compared with the traditional systems and methods, for example, Earlier Deadline First-New Task First (EDF-NTF) by Turner, et al.

Figure 3:
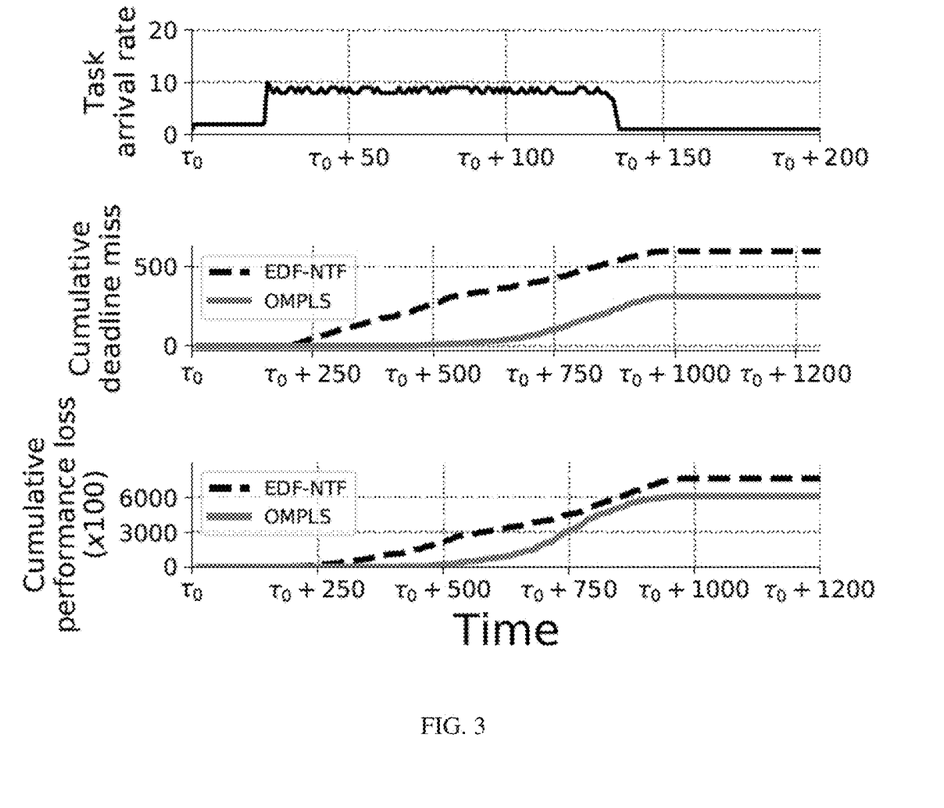
FIG. 3 through 4 illustrates graphically a number of tasks missing deadlines and penalty accumulated for the tasks that arrived during a high traffic period in the multi-robotic environment, in accordance with some embodiments of the present disclosure.
Figure 4:
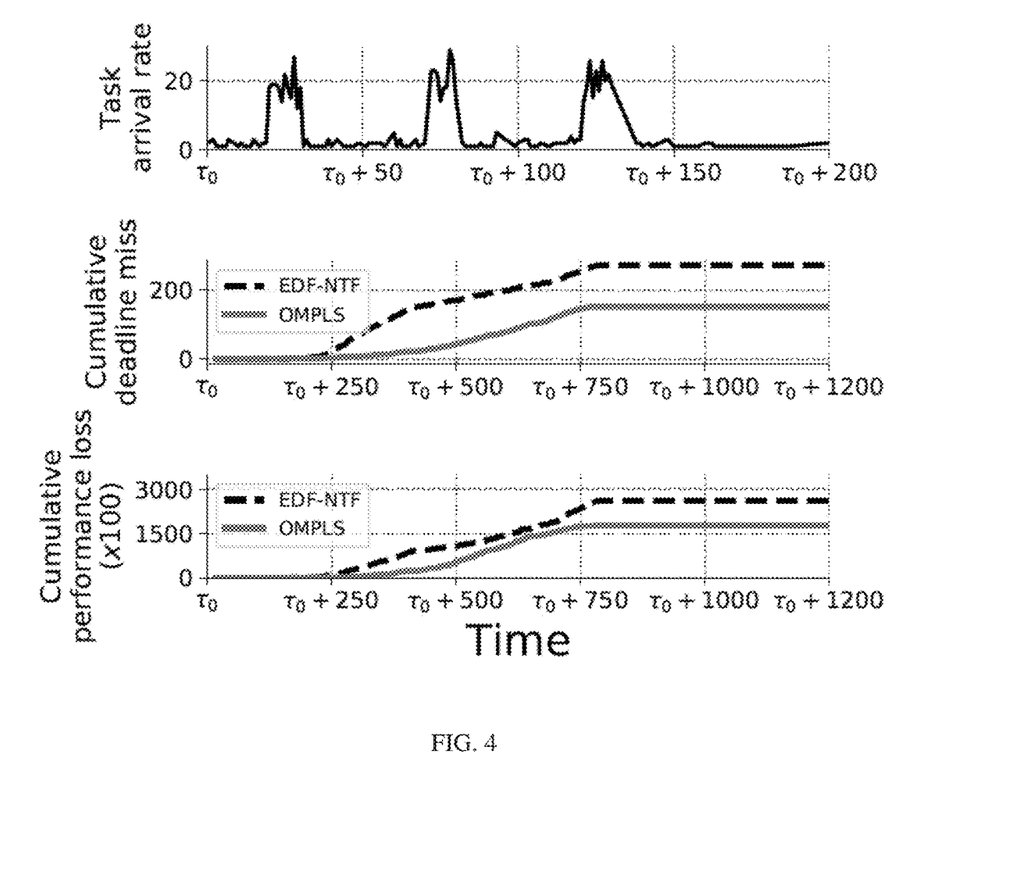

By referring to FIG. 3 and FIG. 4, the number of tasks that missed the deadline and performance loss accumulated for the tasks that arrived during a high traffic period may be referred. The multi-robotic system was in a stable state before the task explosion occurs. By referring to FIG. 3 and FIG. 4 yet again, it may be noted that with a fixed number of robots, as the rate of task inflow increases enormously, the multi-robotic system loses stability, leading to a large number of tasks being executed violating the deadline constraint. The performance loss also gradually starts to accumulate. At the end of the task burst, with task arrival rate gradually falling to normal, the multi-robotic system attains stability, with no further deadline miss and performance loss accumulation. For both kinds of task arrival patterns (steady high traffic and spiking traffic), the scheduler performance is analogous. Experiments were performed during high-traffic.

Figure 5:
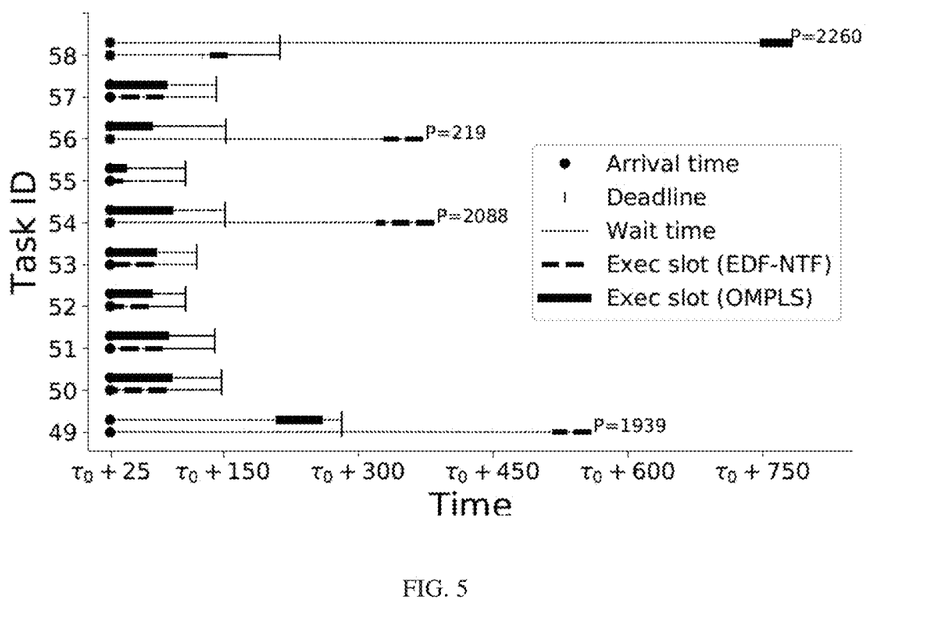
FIG. 5 illustrates graphically the allocation slot and performance loss incurred for tasks that arrived at time $\tau_0+25$, in accordance with some embodiments of the present disclosure.

By referring to FIG. 5, the execution pattern for tasks that arrived at time $\tau_0+25$ may be referred. The OMPLS technique schedules traffic such that fewer tasks miss the deadline as compared to the traditional systems and technique, for example the EDF-NTF technique. The OMPLS technique delays tasks with lower penalty value (for example, task id 58) and gives priority to the tasks with a higher penalty, minimizing the overall loss/penalty to the system. Constant delay in execution of low penalty tasks may lead to starvation. Starvation avoidance is also eliminated by the proposed OMPLS technique as discussed in step 203 supra.

According to an embodiment of the present disclosure, robustness, results, technical advantages, the performance loss minimization and a comparison of the proposed disclosure with traditional systems and methods may now be considered further. By referring to Tables 1 through 4 below, it may be noted that the OMPLS technique does not favor any specific task characteristics. The OMPLS technique may further be evaluated by comparing penalty values and performance loss values to the traditional systems and techniques, d=for example, Auction-based algorithm (AUC-offline).

TABLE 1

| Performance loss | Deadline | AUC-offline P($10^2$x) | AUC-offline DL – M | EDF-NTF P($10^2$x) | EDF-NTF DL – M |
|---|---|---|---|---|---|
| $p_i \in [1, 10]$ | $d_i = 2e_i$ | 14408 | 622 | 13226 | 737 |
| | $d_i \in [e_i, 10e_i]$ | 5343 | 197 | 5578 | 405 |
| | $d_i \in [5e_i, 10e_i]$ | 2954 | 149 | 3110 | 172 |
| | d ← mix | 7633 | 218 | 7608 | 597 |
| p ← same | $d_i = 2e_i$ | 2602 | 622 | 2378 | 93 |
| | $d_i \in [2e_i, 10e_i]$ | 966 | 197 | 1004 | 48 |
| | $d_i \in [5e_i, 10e_i]$ | 520 | 149 | 574 | 172 |
| | d ← mix | 1315 | 218 | 1370 | 597 |
| p ← extreme | $d_i = 2e_i$ | 13812 | 622 | 12571 | 737 |
| | $d_i \in [2e_i, 10e_i]$ | 5096 | 197 | 5381 | 405 |
| | $d_i \in [5e_i, 10e_i]$ | 2419 | 149 | 2796 | 172 |
| | d ← mix | 7086 | 218 | 7356 | 597 |

TABLE 2

| Performance loss | Deadline | OMPLS technique P($10^2$x) | OMPLS technique DL – M |
|---|---|---|---|
| $p_i \in [1, 10]$ | $d_i = 2e_i$ | 10482 | 699 |
| | $d_i \in [e_i, 10e_i]$ | 3925 | 290 |
| | $d_i \in [5e_i, 10e_i]$ | 1619 | 214 |
| | d ← mix | 6098 | 311 |
| p ← same | $d_i = 2e_i$ | 2526 | 624 |
| | $d_i \in [2e_i, 10e_i]$ | 918 | 205 |
| | $d_i \in [5e_i, 10e_i]$ | 498 | 156 |
| | d ← mix | 1212 | 214 |
| p ← extreme | $d_i = 2e_i$ | 6791 | 683 |
| | $d_i \in [2e_i, 10e_i]$ | 1172 | 243 |
| | $d_i \in [5e_i, 10e_i]$ | 686 | 181 |
| | d ← mix | 2157 | 267 |

TABLE 3

| Performance loss | Deadline | Performance loss value reduction % Over AUC - offline | Performance loss value reduction % Over EDF - NTF |
|---|---|---|---|
| $p_i \in [1, 10]$ | $d_i = 2e_i$ | 27.25 | 20.14 |
| | $d_i \in [e_i, 10e_i]$ | 26.55 | 29.64 |
| | $d_i \in [5e_i, 10e_i]$ | 45.17 | 47.92 |
| | d ← mix | 20.10 | 19.85 |
| p ← same | di = $2e_i$ | 2.94 | -6.23 |
| | di $\in [2e_i, 10e_i]$ | 5.00 | 8.56 |
| | $d_i \in [5e_i, 10e_i]$ | 4.32 | 13.29 |
| | d ← mix | 7.77 | 11.51 |
| p ← extreme | $d_i = 2e_i$ | 50.83 | 45.98 |
| | $d_i \in [2e_i, 10e_i]$ | 76.98 | 78.20 |
| | $d_i \in [5e_i, 10e_i]$ | 71.63 | 75.45 |
| | d ← mix | 69.55 | 70.67 |

TABLE 4

| Performance loss | Deadline | Competitive ratio (Deadline meet) Over AUC - offline |
|---|---|---|
| $p_i \in [1, 10]$ | $d_i = 2e_i$ | 0.79 |
| | $d_i \in [e_i, 10e_i]$ | 0.88 |
| | $d_i \in [5e_i, 10e_i]$ | 0.92 |
| | d ← mix | 0.88 |
| p ← same | di = $2e_i$ | 0.99 |
| | di $\in [2e_i, 10e_i]$ | 0.99 |
| | $d_i \in [5e_i, 10e_i]$ | 0.99 |
| | d ← mix | 1 |
| p ← extreme | $d_i = 2e_i$ | 0.83 |
| | $d_i \in [2e_i, 10e_i]$ | 0.94 |
| | $d_i \in [5e_i, 10e_i]$ | 0.96 |
| | d ← mix | 0.93 |

Through the AUC-offline technique attempts to maximize the profit by executing as many tasks as possible within its deadline, it does not provides for scheduling of remaining tasks (missing deadline) at the end of schedulable task(s). The OMPLS technique schedules the remaining tasks (that missed their deadline) are scheduled at the end of the schedulable task. This results in an accumulated performance value in the AUC-based scheduling. Table 3 provides the competitiveness of the OMPLS technique against the AUC-offline technique in terms of the number of tasks meeting the deadline. By referring to Table 4, it may be noted that the OMPLS technique attains a maximum competitive ratio of 1 and a minimum of 0.83.

Figure 6:
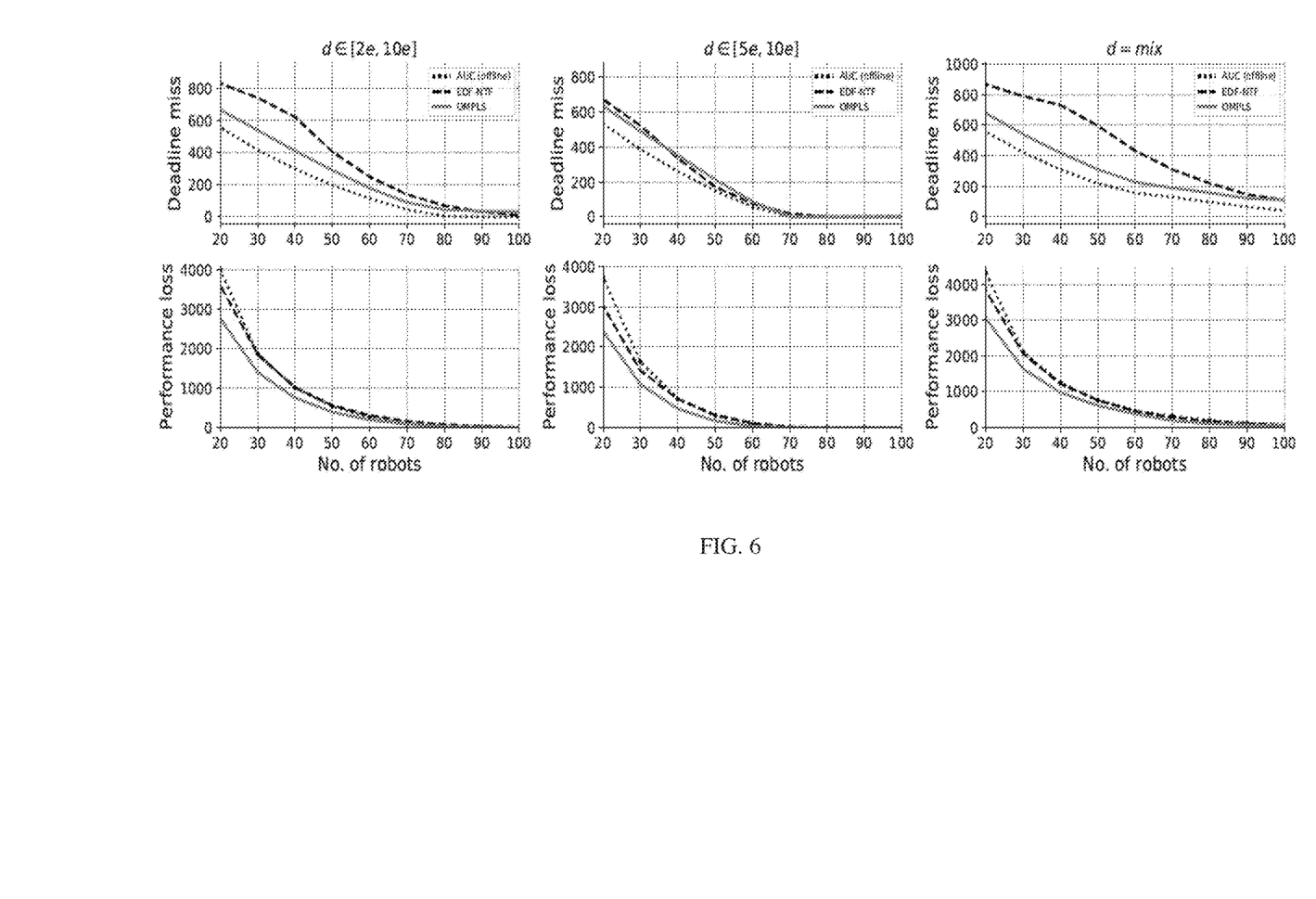
FIG. 6 illustrates graphically a performance comparison for steady high traffic, linearly increasing robots, penalty values distributed between [1, 10] and three different deadline patterns by implementing traditional systems and methods and the method disclosed, in accordance with some embodiments of the present disclosure.

By referring to FIG. 6, it may be noted that the proposed OMPLS technique outperforms the traditional systems and techniques by optimizing the scheduling of non-preemptive tasks. Intuitively, the OMPLS technique when the number of available robots are large for executing task(s), the performance of a scheduler must improve in terms of minimizing of the deadline miss and the performance loss value. This trend is reflected by the AUC-offline technique, the EDF-NTF technique as well as by the method disclosed. The number of available robots were varied between 20 and 100, wherein the variation confronts two aspects, that is, robustness of the scheduler with varying number of resources (robots), and performance improvement with the increasing number of resources.

With $d_i \in [5e_i, 10e_i]$, wherein the tasks have a much larger deadline, by using 70 robots almost all tasks are successfully executed by implementing the proposed OMPLS technique, without missing any of the deadline constraint. To achieve the same performance, the EDF-NTF technique required a higher number of robots. Further, with $d_i \in [2e_i, 10e_i]$ and d←mix, when a prodigious number of tasks are bound to miss deadline, the proposed OMPLS technique outperforms both the AUC-offline technique and the EDF-NTF technique in terms of incurred performance loss values. It may be noted that the number of tasks missing the deadline is always less in AUC-offline technique, which may be due to the reason that the AUC-offline technique being an offline approach where the entire task set is known to the scheduler at the beginning. The proposed OMPLS technique delays tasks for which penalty is less, whereas the traditional systems and techniques, for example, the EDF-NTF technique delays a task beyond its deadline.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of optimizing the scheduling of non-preemptive tasks in the multi-robot environment. The embodiment, thus provides for scheduling, by implementing the OMPLS technique, initially, tasks with the higher performance loss value and then secondly, tasks that can be scheduled within their deadline and having the low performance loss value amongst the merged tasks; and finally minimizing, the performance loss value of the remaining subset of tasks that cannot be scheduled within the predefined deadline. Moreover, the embodiments herein further provides executing the priority update on each of the remaining subset of tasks for optimizing the scheduling of the non-preemptive tasks.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for optimizing scheduling of non-preemptive tasks in a multi-robot environment, the method comprising a processor implemented steps of:
   defining, via a set of robots, a plurality of tasks, wherein each of the plurality of tasks is a non-preemptive schedulable task characterized by an arrival time, an execution time, a deadline and a performance loss function per time unit, and wherein each of the plurality of tasks is executed in the multi robot environment (201);
   merging, by one or more hardware processors, one or more previously assigned tasks and one or more newly arriving tasks from the defined plurality of tasks, wherein the one or more previously assigned tasks are non-executed tasks already assigned to one or more robots amongst the set of robots, and wherein the one or more newly arriving tasks comprise a non-executed task to be assigned amongst the set of robots (202);
   optimizing scheduling of the merged in the multi-robot environment, wherein the optimizing comprises (203):
      scheduling, by implementing an Online Minimum Performance Loss Scheduling (OMPLS) technique, a first set of tasks amongst the set of robots, wherein the first set of tasks comprise tasks with a higher performance loss value amongst the merged tasks, and wherein the first set of tasks further comprise at least one task exceeding a threshold of waiting time and having a lesser priority over the tasks with the higher performance loss value;
      scheduling, via the OMPLS technique, a second set of tasks amongst the set of robots, wherein the second set of tasks comprise tasks that can be scheduled within their deadline and having a low performance loss value amongst the merged tasks; and
      minimizing, by a list-scheduling technique, a performance loss value of a remaining subset of tasks, wherein the remaining subset of tasks comprise tasks that cannot be scheduled within a pre-defined deadline.

2. The method as claimed in claim 1, wherein the step of minimizing the performance loss value of the remaining subset of tasks comprises eliminating, via the list-scheduling technique, one or more high priority tasks from the newly arriving tasks for optimizing scheduling of the non-preemptive tasks.

3. The method as claimed in claim 1, wherein the step of merging is performed by sorting the one or more previously assigned tasks and the one or more newly arriving tasks in a queue based upon an non-increasing order of a performance loss value corresponding to the one or more previously assigned tasks and the one or more newly arriving tasks.

4. The method as claimed in claim 2, wherein the eliminated one or more high priority tasks are assigned to an idle robot amongst the set of robots, and wherein the idle robot is a robot not executing any of the plurality of tasks.

5. The method as claimed in claim 2, wherein the step of eliminating the one or more high priority tasks is performed iteratively until each task amongst the plurality of tasks is assigned to at least one robot.

6. The method as claimed in claim 1, wherein the OMPLS technique comprises executing a priority update on each of the remaining subset of tasks for optimizing scheduling of the non-preemptive tasks.

7. The method as claimed in claim 6, wherein the priority update is executed by incrementing a priority function of each of the remaining subset of tasks upon determining that the execution time of each of the remaining subset of tasks is greater than an initial pre-defined threshold, and wherein the initial pre-defined threshold is identified using a pre-defined deadline.

8. A system (100) for optimizing scheduling of non-preemptive tasks in a multi-robot environment, the system (100) comprising:
   a memory (102) storing instructions;
   one or more communication interfaces (106); and
   one or more hardware processors (104) coupled to the memory (102) via the one or more communication interfaces (106), wherein the one or more hardware processors (104) are configured by the instructions to:
      define, via a set of robots, a plurality of tasks, wherein each of the plurality of tasks is a non-preemptive schedulable task characterized by an arrival time, an execution time and a performance loss function per time unit, wherein each of the plurality of tasks is executed in the multi robot environment;
      merge one or more previously assigned tasks and one or more newly arriving tasks from the defined plurality of tasks, wherein the one or more previously assigned tasks are non-executed tasks already assigned to one or more robots amongst the set of robots, and wherein the one or more newly arriving tasks comprise a non-executed task to be assigned amongst the set of robots;
      optimize scheduling of the merged tasks in the multi-robot environment, wherein the optimizing comprises:
         schedule, by implementing an Online Minimum Performance Loss Scheduling (OMPLS) technique, a first set of tasks amongst the set of robots, wherein the first set of tasks comprise tasks with a higher performance loss value amongst the merged tasks, and wherein the first set of tasks further comprise at least one task exceeding a threshold of waiting time and having a lesser priority over the tasks with the higher performance loss value;
         schedule, via the OMPLS technique, a second set of tasks amongst the set of robots, wherein the second set of tasks comprise tasks that can be scheduled within their deadline and having a low performance loss value amongst the merged tasks; and
         minimize, by a list-scheduling technique, a performance loss value of a remaining subset of tasks, wherein the remaining subset of tasks comprise tasks that cannot be scheduled within a pre-defined deadline.

9. The system (100) as claimed in claim 8, wherein the one or more hardware processors (104) are configured to minimize the performance loss value of the remaining subset of tasks by eliminating, via the list-scheduling technique, one or more high priority tasks from the newly arriving tasks for optimizing scheduling of the non-preemptive tasks.

10. The system as claimed in claim 8, wherein the one or more hardware processors (104) are configured to merge the one or more previously assigned tasks and the one or more newly arriving tasks in a queue based upon an non-increasing order of a performance loss value corresponding to the one or more previously assigned tasks and the one or more newly arriving tasks.

11. The system (100) as claimed in claim 9, wherein the one or more hardware processors (104) are configured to assign the eliminated one or more high priority tasks to an idle robot amongst the set of robots, and wherein the idle robot is a robot not executing any of the plurality of tasks.

12. The system (100) as claimed in claim 9, wherein the one or more hardware processors (104) are configured to iteratively perform the step of eliminating the one or more high priority tasks until each task amongst the plurality of tasks is assigned to at least one robot.

13. The system (100) as claimed in claim 8, wherein the one or more hardware processors (104) are configured to implement the OMPLS technique by executing a priority update on each of the remaining subset of tasks for optimizing scheduling of the non-preemptive tasks.

14. The system (100) as claimed in claim 13, wherein the one or more hardware processors (104) are configured to execute the priority update by incrementing a priority function of each of the remaining subset of tasks upon determining that the execution time of each of the remaining subset of tasks is greater than an initial pre-defined threshold, and wherein the initial pre-defined threshold is identified using a pre-defined deadline.

15. One or more non-transitory machine readable information storage mediums comprising one or more instructions which when executed by one or more hardware processors cause:
    defining, via a set of robots, a plurality of tasks, wherein each of the plurality of tasks is a non-preemptive schedulable task characterized by an arrival time, an execution time, a deadline and a performance loss function per time unit, and wherein each of the plurality of tasks is executed in the multi robot environment (201);
    merging, by one or more hardware processors, one or more previously assigned tasks and one or more newly arriving tasks from the defined plurality of tasks, wherein the one or more previously assigned tasks are non-executed tasks already assigned to one or more robots amongst the set of robots, and wherein the one or more newly arriving tasks comprise a non-executed task to be assigned amongst the set of robots (202);
    optimizing scheduling of the merged in the multi-robot environment, wherein the optimizing comprises (203):
    scheduling, by implementing an Online Minimum Performance Loss Scheduling (OMPLS) technique, a first set of tasks amongst the set of robots, wherein the first set of tasks comprise tasks with a higher performance loss value amongst the merged tasks, and wherein the first set of tasks further comprise at least one task exceeding a threshold of waiting time and having a lesser priority over the tasks with the higher performance loss value;
    scheduling, via the OMPLS technique, a second set of tasks amongst the set of robots, wherein the second set of tasks comprise tasks that can be scheduled within their deadline and having a low performance loss value amongst the merged tasks; and
    minimizing, by a list-scheduling technique, a performance loss value of a remaining subset of tasks, wherein the remaining subset of tasks comprise tasks that cannot be scheduled within a pre-defined deadline.

16. The one or more non-transitory machine readable information storage mediums of claim 15, wherein the step of minimizing the performance loss value of the remaining subset of tasks comprises eliminating, via the list-scheduling technique, one or more high priority tasks from the newly arriving tasks for optimizing scheduling of the non-preemptive tasks.

17. The one or more non-transitory machine readable information storage mediums of claim 15, wherein the step of merging is performed by sorting the one or more previously assigned tasks and the one or more newly arriving tasks in a queue based upon an non-increasing order of a performance loss value corresponding to the one or more previously assigned tasks and the one or more newly arriving tasks.

18. The one or more non-transitory machine readable information storage mediums of claim 16, wherein the eliminated one or more high priority tasks are assigned to an idle robot amongst the set of robots, and wherein the idle robot is a robot not executing any of the plurality of tasks.

19. The one or more non-transitory machine readable information storage mediums of claim 16, wherein the step of eliminating the one or more high priority tasks is performed iteratively until each task amongst the plurality of tasks is assigned to at least one robot.

20. The one or more non-transitory machine readable information storage mediums of claim 15, wherein the OMPLS technique comprises executing a priority update on each of the remaining subset of tasks for optimizing scheduling of the non-preemptive tasks.

* * * * *